(12) United States Patent
Brassac et al.

(10) Patent No.: US 6,928,539 B2
(45) Date of Patent: Aug. 9, 2005

(54) MULTIPROCESSOR APPLICATION INTERFACE REQUIRING NO ULTILIZATION OF A MULTIPROCESSOR OPERATING SYSTEM

(75) Inventors: Claude Brassac, Saint Germian En Laye (FR); Alain Vigor, Saint Germian En Laye (FR)

(73) Assignee: Bull S.A., Louveciennes (FR)

( * ) Notice: Subject to any disclaimer, the term of this patent is extended or adjusted under 35 U.S.C. 154(b) by 765 days.

(21) Appl. No.: 09/858,490

(22) Filed: May 17, 2001

(65) Prior Publication Data

US 2001/0044913 A1 Nov. 22, 2001

(30) Foreign Application Priority Data

May 17, 2000 (FR) .............................................. 00 06286

(51) Int. Cl.$^7$ ................................................. G06F 9/24
(52) U.S. Cl. ................................ 713/1; 713/2; 712/16; 712/245
(58) Field of Search .............................. 713/1, 2, 100; 712/16, 28, 32, 233, 245; 711/147

(56) References Cited

U.S. PATENT DOCUMENTS

| | | |
|---|---|---|
| 5,603,033 A * | 2/1997 | Joannin ....................... 717/124 |
| 5,687,073 A | 11/1997 | Kishimoto |
| 5,867,703 A | 2/1999 | Miller et al. |
| 6,216,216 B1 * | 4/2001 | Bonola ......................... 712/28 |

FOREIGN PATENT DOCUMENTS

EP 0 335 812 A 10/1989

OTHER PUBLICATIONS

Corsini P et al., "Multibug: Interactive Debugging in Distributed Systems" IEEE Micro, US, IEEE, Inc., NY, vol. 6, No. 3, Jun. 1, 1986, pp. 26–33,XP000719945, ISSN: 0272–1732–Abstract, p. 29, Lefthand Column, Line 13–Line 29.

* cited by examiner

*Primary Examiner*—Thuan Du
(74) *Attorney, Agent, or Firm*—Miles & Stockbridge P.C.; Edward J. Kondracki

(57) ABSTRACT

A test monitor loaded into a multiprocessor machine comprises a program (31) designed to interpret a script language for writing tests, a program (29) that constitutes a kernel part for conducting the tests according to the scripts, and a library (30) of functions that constitutes an application program interface with the firmware of the machine 1. This monitor implements a method for executing instruction sequences simultaneously in several processors (3, 4, 5) of a multiprocessor machine (1). The method comprises a first step (8) in which a single processor operating system is booted in a first processor (2) and a second step (9) in which the first processor (1) orders at least one other processor (3) of the machine, called an application processor, to execute one or more instruction sequences (17, 18, 19) under the control of said first processor.

3 Claims, 3 Drawing Sheets

MULTIPROCESSOR APPLICATION INTERFACE REQUIRING NO ULTILIZATION OF A MULTIPROCESSOR OPERATING SYSTEM

The field of application of the invention is the testing of multiprocessor machines. Tests are necessary for debugging a machine in the design phase, for verifying compliance in the production phase, and for maintenance in the operating phase.

Testing multiprocessor machines is more difficult than testing single processor machines. In essence, in a single processor machine, a single processor executes only one instruction of the operating system or application tasks at a given time, even though, as a result of time sharing, these tasks seem to be executed simultaneously.

In a multiprocessor machine, several processors can simultaneously execute various instructions that modify the state of the machine. A multiprocessor operating system generally includes functions for dispatching processes to the processors. It is therefore difficult to perform reproducible tests, since the operating system does not necessarily distribute the processes to the processors the same way twice. It is also difficult to control which processor an instruction is executed in at a given time. This results in disadvantages in verifying the behavior of the processors in a multiprocessor environment of the machine, for example in connection with caches of various levels.

In order to eliminate the aforementioned disadvantages, a first subject of the invention is a method for executing instruction sequences simultaneously in several processors of a multiprocessor machine, characterized in that it comprises:
- a first step in which a single processor operating system is booted in a first processor;
- a second step in which the first processor orders at least one other processor of the machine to execute one or more instruction sequences under the control of said first processor.

Thus, this method makes it possible to execute several test code sequences simultaneously in several processors, while controlling which processor a given test code sequence is executed in. This method constitutes a simple way to conduct tests in a multiprocessor context. In essence, the single processor operating system has no effect on the operation of the processors apart from the first processor.

A second subject of the invention is a test monitor for implementing a method according to the invention.

Figure 1:
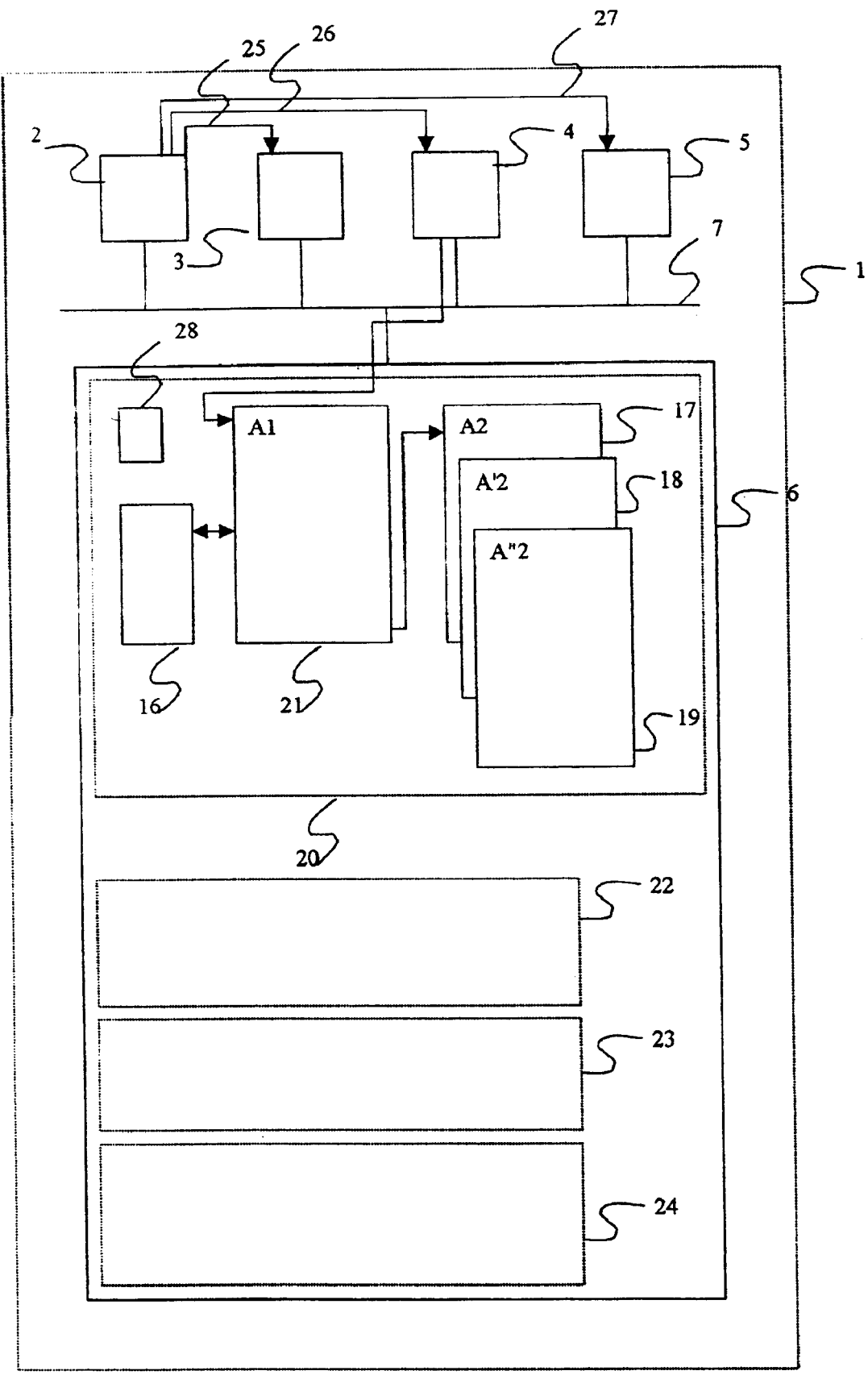
Figure 2:
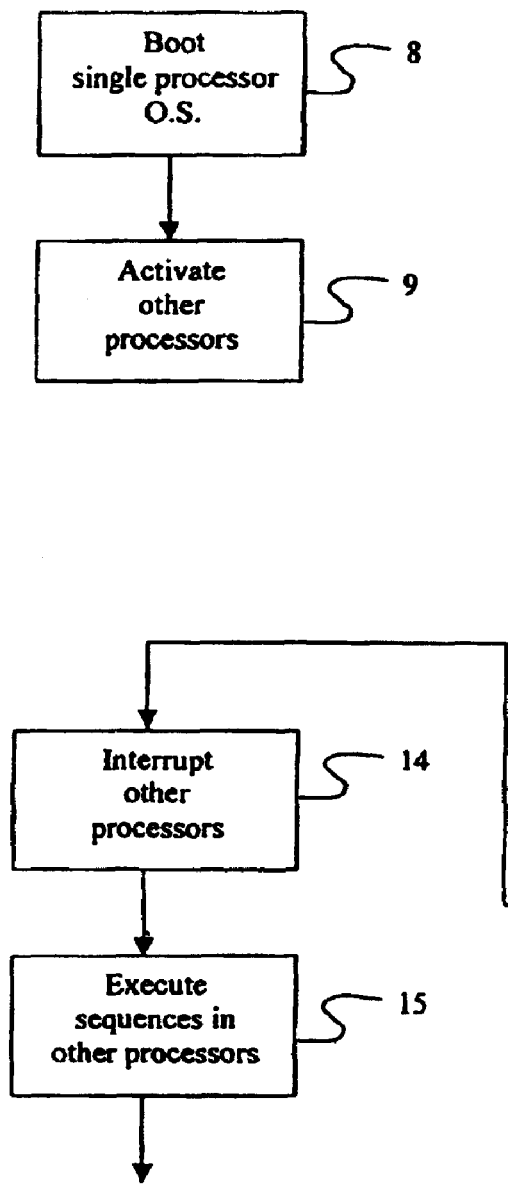
Figure 3:
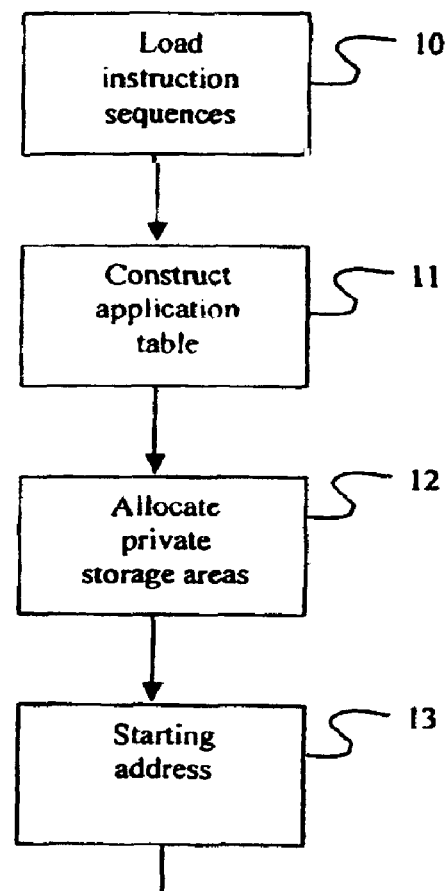
Figure 4:
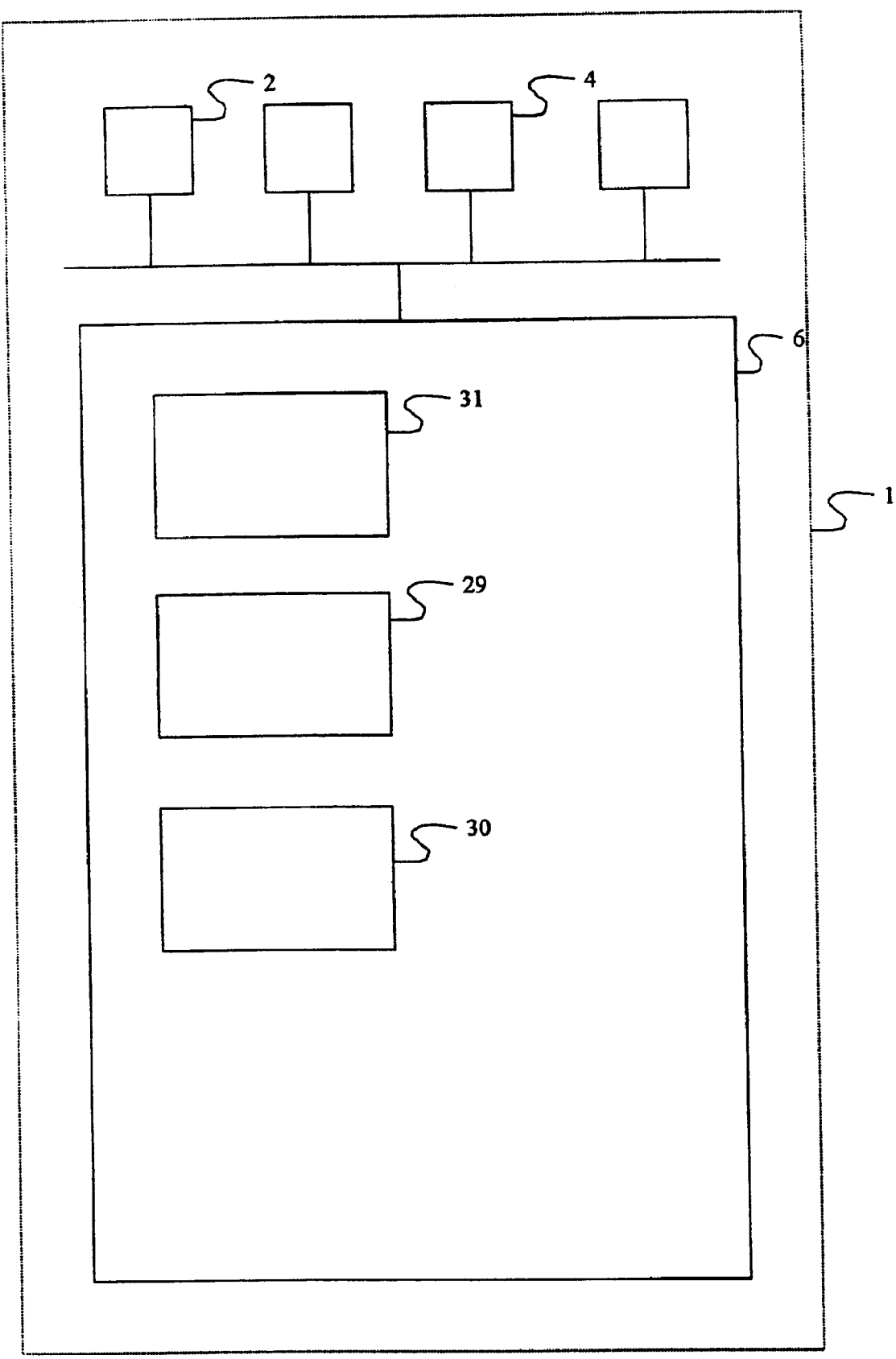

Other details and advantages of the invention appear in the following description in reference to the figures, in which:

FIG. 1 presents a multiprocessor machine;
FIG. 2 presents the main steps of the method;
FIG. 3 presents the essential phases of one step;
FIG. 4 presents the elements of a test monitor.

Referring to FIG. 1, a machine 1 comprises several processors 2, 3, 4, 5, which access a memory 6 via a bus 7.

Referring to FIG. 2, a simplified, single processor operating system (OS) is booted in the processor 2 in a step 8. The processor 2, also called a BSP (for Bootstrap Processor) is distinguished from the other processors, also called AP (for Application Processor), in that the simplified single processor operating system sees only the processor 2. The single processor operating system is booted by firmware functions of the machine, also known as the BIOS (Basic Input Output System), which constitutes a routine linking the operating system and the hardware. These firmware functions are generally stored in permanent memories, which associate them with the hardware functions performed by means of microcircuits. The single processor operating system allows the processor 2 to activate a step 9 in which the processor 2 runs a test application while ordering the other processors 3, 4, 5 to execute instruction sequences.

Step 2 comprises several phases explained in reference to FIG. 3.

In a phase 10, the processor 2 loads into a storage area 20 an instruction sequence 21 at an address A1, and one or more instruction sequences 17, 18, 19 at an address A2, A'2, A"2. The instruction sequences 17, 18, and 19, are available in disk files, not represented, into which they have been written beforehand, for example by an independent computer. Advantageously, the instruction sequence 21 is written in assembly language, since it directly uses processor instructions that serve to initialize the processor registers, so as to enable a processor to execute a programmed sequence. The instruction sequences 17, 18, 19 in this case constitute test code sequences. Advantageously, the test code sequences are obtained by programming in an advanced language, for example C language. The processor 2 also loads into the storage area 20 a system of locks on certain resources of the machine 1.

In a phase 11, the processor 2 uses firmware functions of the BIOS to index each of the other processors 3, 4, 5 of the machine 1. These functions generally use firmware configuration tables of the machine. The processor 2 then constructs, in the storage area 20, an application table 16 with several rows, wherein each row is accessible by means of an identifier of a processor of the machine. For each row of the table 16, the processor associates a storage area 22, 23, 24, respectively specific to each processor 3, 4, 5. The processor 2 then stores, in each row of the table 16, data required to establish an execution context for each processor 3, 4, 5 whose identifier references this row. Appearing among this data, for example, is an address A2, A'2, A"2 of the sequence 17, 18, 19 to be executed by the processor 3, 4, 5 whose identifier references this row. A row of the table 16 can contain a different address than that contained in another row if the associated processors are called to execute different instruction sequences, or identical addresses if the associated processors are called to execute the same instruction sequences.

In a phase 12, the processor 2 allocates a private storage area 22, 23, 24 to each processor 3, 4, 5 by storing, in the corresponding row of the table 16, a starting address and a private storage area size.

In a phase 13, the processor 2 uses a firmware function of the BIOS to store the starting address A1 of the instruction sequence 21 in a firmware bootstrap table 28. The table 28 is provided in order to give the address at which a processor starts when it receives an interrupt.

In a phase 14, the processor 2 sends an interrupt 25, 26, 27, to the respective processor or processors 3, 4, 5 intended to be tested.

In a phase 15, when the processor 4 receives the interrupt 26, it is branched by the interrupt controller to the entry point of the instruction sequence 21. While executing the instruction sequence 21, the processor 4 uses its identifier to consult the row of the table 16 that is associated with it, in order to initialize it. In particular, the processor 4 constructs in its private storage area 23, using the sequence 21, data structures such as execution stacks required to establish an execution context. The instruction sequence ends with a call to a testing procedure, which in the execution context of the processor 4, for example, is the test code sequence 17. The processor 4 then executes its specific sequence 17. Advantageously, the programming of the sequence 23 provides for the utilization of the lock structure created in phase 11 in order to maintain the consistency of the resources of the machine 1, which is accessed by the other processors 3, 5 as in a multiprocessor operating system.

The explanations of the preceding phases 14 and 15 for the processor 4 are also valid for any processor 3, 5. Thus, each processor 3, 4, 5 executes its own test code sequence 17, 18, 19 in parallel. Several processors can also execute the same test sequence 17 if the same address A2 has been stored in the table 16. After the execution of the test code sequences 17, 18, 19, the machine 1 is in a controlled, and hence reproducible, state, available for the execution of new code sequences by repeating phases 12 through 15.

Referring to FIG. 4, a test monitor according to the invention comprises, in a memory 6 of the machine, a program 31 designed to interpret a script language intended for those who write the tests, a program 29 that constitutes a kernel part for conducting the tests according to the scripts, and a library 30 of functions that constitutes an application program interface (API) with the firmware of the machine 1.

When a user wants to perform a series of tests in a multiprocessor environment, he starts the test monitor, which runs on the simplified single processor operating system. This has the effect of activating the kernel 29, which implements phases 10 through 14 using functions contained in the library 30. Each processor activated by phase 14 then triggers phase 15 using the functions of the library 30.

The library 30 contains a function for constructing the table 16 in phase 11 that calls firmware processor identification functions, a function for allocating an execution context to an application processor in phase 12, a function for storing a starting point for the application processor in phase 13, a function for starting one application processor independently from the others in phase 14, and lock functions.

The lock functions are not the standard lock functions of the single processor operating system which, having only a few instructions, can be executed simultaneously in various processors. These lock functions are performed by means of known atomic operations such as Test&Set, Load&Reserve. Remember that an atomic operation is such that no other operation can be performed between the start and the end of the operation. For further details, please refer, for example, to French patent 2,754,925.

What is claimed is:

1. Method for executing instruction sequences simultaneously in several processors of a multiprocessor machine, comprising:
   a first step in which a first processor of a single processor operating system is booted;
   a second step in which the first processor orders an application processor to execute one or more instruction sequences under the control of said first processor; and
   a third step in which the first processor constructs an application table, the application table having a plurality of rows with each of the plurality of rows having an associated storage area that stores data for an execution context for each of the several processors.

2. Method for executing instruction sequences simultaneously in several processors of a multiprocessor machine, comprising:
   a first step in which a first processor of a single processor operating system is booted;
   a second step in which the first processor orders an application processor to execute one or more instruction sequences under the control of said first processor, wherein the second step comprises a plurality of phases, including:
   a first phase in which said first processor loads, at a first address of a common storage area, a first instruction sequence executable by the application processors so as to initialize said first processor, and at least one second address of said common storage area, a second instruction sequence executable by the application processors after initialization;
   a second phase in which said first processor constructs in said common storage area of the machine, by scanning the firmware configuration tables of the machine, an application table with rows that are each accessible by means of an application processor identifier containing said second address;
   a third phase in which said first processor allocates a private storage area to each application processor;
   a fourth phase in which said first processor stores, in a firmware bootstrap table of an application processor, said first address; and
   a fifth phase in which said first processor sends an interrupt to at least one application processor, which results in a branching of said application processor to the first address contained in the firmware bootstrap table so that said application processor executes the first instruction sequence, after which said application processor is branched to the second address contained in the row of the application table that is accessible using the identifier of said application processor.

3. Method according to claim 2, wherein any second instruction sequence includes functions for locking/unlocking the resources of the machine that an application processor accesses.

* * * * *